United States Patent
Bolton et al.

(10) Patent No.: US 9,730,268 B2
(45) Date of Patent: Aug. 8, 2017

(54) COMMUNICATION BETWEEN HOST AND ACCESSORY DEVICES USING ACCESSORY PROTOCOLS VIA WIRELESS TRANSPORT

(71) Applicant: Apple Inc., Cupertino, CA (US)

(72) Inventors: Lawrence G. Bolton, Mahomet, IL (US); Jason J. Yew, Palo Alto, CA (US); Robert J. Walsh, Sunnyvale, CA (US); Awartika Pandey, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 474 days.

(21) Appl. No.: 14/296,302

(22) Filed: Jun. 4, 2014

(65) Prior Publication Data

US 2014/0365694 A1    Dec. 11, 2014

Related U.S. Application Data

(60) Provisional application No. 61/832,650, filed on Jun. 7, 2013.

(51) Int. Cl.
*G06F 15/16* (2006.01)
*H04W 80/02* (2009.01)
(Continued)

(52) U.S. Cl.
CPC .......... *H04W 80/02* (2013.01); *G06F 13/385* (2013.01); *H04W 8/005* (2013.01); *H04W 76/02* (2013.01); *G06F 2213/3814* (2013.01)

(58) Field of Classification Search
CPC .......... G06F 15/16; H04L 29/06; H04Q 7/28; H04B 7/00
See application file for complete search history.

(56) References Cited

U.S. PATENT DOCUMENTS 5,734,820 A * 3/1998 Howard .................. G06F 21/31
726/21
7,616,594 B2 * 11/2009 Roberts ................. H04W 48/14
370/310
(Continued)

FOREIGN PATENT DOCUMENTS

WO    2006073702 A1    7/2006
WO    2010/007578 A1    1/2010

OTHER PUBLICATIONS

Gomez, Carles, et al., "Overview and Evaluation of Bluetooth Low Engery: An Emerging Low-Power Wireless Technology," Sensors, 2012, vol. 12, pp. 11734-11753.
(Continued)

*Primary Examiner* — Henry Tsai
*Assistant Examiner* — Christopher a Daley
(74) *Attorney, Agent, or Firm* — Kilpatrick Townsend & Stockton, LLP

(57) ABSTRACT

An accessory can communicate wirelessly with a host device such as a portable electronic device. Existing accessory protocols developed for wired communication can be used without modification, and a wireless network connecting the two devices can provide a transport or channel connecting the two devices. Establishing a wireless channel can involve the active participation of both devices. For instance, the host device can create and identify virtual port to be used by the accessory, after which the accessory can initiate communication on that virtual port. A host device can be configured to automatically connect to certain accessories upon detection of that accessory on a wireless network under various specific conditions. Encryption of accessory-protocol communications between an accessory and a host device is also provided.

18 Claims, 8 Drawing Sheets

(51) Int. Cl.
  *H04W 8/00*    (2009.01)
  *H04W 76/02*   (2009.01)
  *G06F 13/38*   (2006.01)
  *H04L 29/06*   (2006.01)
  *H04B 7/00*    (2006.01)

(56) References Cited

U.S. PATENT DOCUMENTS

| | | |
|---|---|---|
| 8,006,023 B1 | 8/2011 | Pan et al. |
| 8,286,221 B2 | 10/2012 | Muller |
| 8,380,977 B2 * | 2/2013 | Son ............... H04L 63/0428 380/270 |
| 8,452,903 B2 | 5/2013 | Bolton et al. |
| 8,472,874 B2 | 6/2013 | Tang et al. |
| 8,473,325 B2 | 6/2013 | Barnhill |
| 8,516,088 B2 | 8/2013 | Bae |
| 9,009,466 B2 * | 4/2015 | Li ..................... H04L 63/162 713/160 |
| 2003/0043771 A1 * | 3/2003 | Mizutani ............ H04W 76/02 370/338 |
| 2005/0193137 A1 | 9/2005 | Farnham |
| 2009/0029691 A1 | 1/2009 | Shen |
| 2010/0211878 A1 | 8/2010 | Spijkerbosch |
| 2010/0235373 A1 | 9/2010 | Holden |
| 2011/0022916 A1 | 1/2011 | Desai |
| 2011/0185048 A1 | 7/2011 | Yew |
| 2012/0296986 A1 | 11/2012 | Hassan |
| 2012/0309289 A1 | 12/2012 | Walsh et al. |
| 2013/0014232 A1 * | 1/2013 | Louboutin ........ H04M 1/72527 726/5 |
| 2013/0283045 A1 | 10/2013 | Li |

OTHER PUBLICATIONS

Taiwan Office Action issued Feb. 23, 2016 in Patent Application No. 103119840. 17 pages.

International Search Report and Written Opinion mailed Dec. 11, 2014 in PCT/US2014/041101, 11 pages.

Korean Office Action mailed Dec. 27, 2016 in Patent Application No. 10-2015-7034778. 14 pages (includes English translation).

HID WG, "Device Identification Profile Specification." Bluetooth Specification, Device Identification. Jul. 26, 2017. 22 pages.

* cited by examiner

COMMUNICATION BETWEEN HOST AND ACCESSORY DEVICES USING ACCESSORY PROTOCOLS VIA WIRELESS TRANSPORT

CROSS-REFERENCE TO RELATED APPLICATION

This application claims the benefit of U.S. Provisional Application No. 61/832,650, filed Jun. 7, 2013, entitled "Communication Between Host and Accessory Devices Using Accessory Protocols via Wireless Transport," the disclosure of which is incorporated by reference herein in its entirety.

BACKGROUND

The present disclosure relates generally to communication between a host device and an accessory device and in particular to communication between host and accessory devices using accessory protocols via a wireless transport.

Portable electronic devices can store and provide interactive user access to data objects including media files (audio, video, images) in various formats, documents, artwork files, personal data (e.g., contacts, calendar), forms and so on. Thus, a user can operate a portable electronic device to listen to music, watch movies, view and manage personal information, and so on. In some instances, a portable electronic device can also create data objects, e.g., through audio or video recording, taking photos using still cameras, collecting and processing user input or the like.

Some portable electronic devices can also communicate with various accessories to enhance user interaction with the device. For example, the portable electronic device can be connected to an accessory that has a larger display or more powerful speakers, or a more convenient user interface, than the portable electronic device. Such accessories can be used to present and interact with media content and other information stored on the portable electronic device.

SUMMARY

Certain embodiments of the present invention relate to allowing an accessory (also referred to as an accessory device) to communicate wirelessly with a host device (also referred to as a host), such as a portable electronic device. Existing accessory protocols developed for wired communication can be used without modification, and a wireless network connecting the two devices can provide a transport or channel connecting the two devices. Establishing a wireless channel can involve the active participation of both devices. For instance, as described below, prerequisites for establishing a wireless channel between a host device and an accessory can include the host device creating and identifying a virtual port to be used by the accessory, after which the accessory can initiate communication on that virtual port. A host device can be configured to automatically (i.e., without user intervention) connect to certain accessories upon detection of that accessory on a wireless network. The auto-connect functionality can be managed in a manner that matches user expectations. In some embodiments, accessory-protocol communications between an accessory and a host device can be selectively encrypted within the accessory protocol.

The following detailed description together with the accompanying drawings will provide a better understanding of the nature and advantages of the present invention.

DETAILED DESCRIPTION

Certain embodiments of the present invention relate to allowing an accessory (also referred to as an accessory device) to communicate wirelessly with a host device (also referred to as a host), such as a portable electronic device. Existing accessory protocols developed for wired communication can be used without modification, and a wireless network connecting the two devices can provide a transport or channel connecting the two devices. Establishing a wireless channel can involve the active participation of both devices. For instance, as described below, prerequisites for establishing a wireless channel between a host device and an accessory can include the host device creating and identifying a virtual port to be used by the accessory, after which the accessory can initiate communication on that virtual port. A host device can be configured to automatically (i.e., without user intervention) connect to certain accessories upon detection of that accessory on a wireless network. The auto-connect functionality can be managed in a manner that matches user expectations. In some embodiments, accessory-protocol communications between an accessory and a host device can be selectively encrypted within the accessory protocol.

Figure 1:
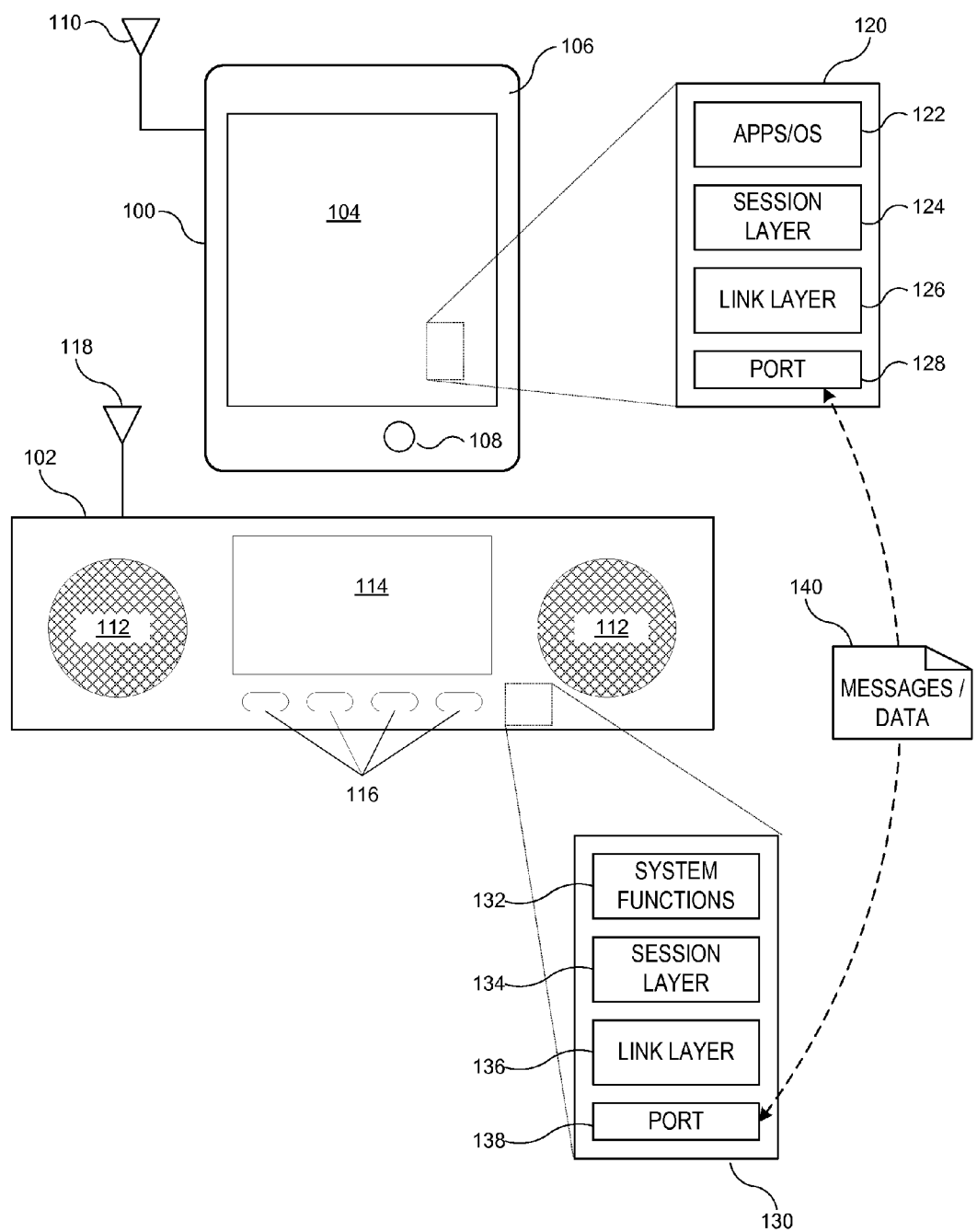
FIG. 1 shows a host device and an accessory according to an embodiment of the present invention.

FIG. 1 shows a host device 100 and an accessory 102 according to an embodiment of the present invention.

Host device 100 can be, for example, a handheld device such as a media player, smart phone, or personal digital assistant; a tablet computer; a laptop computer; a desktop computer; or any other electronic device capable of sending data and communicating with other devices. In some embodiments, host device 100 can be a portable device (meaning a device that is easily carried by a user from place to place for use in different places), but this is not required. In the example shown, host device 100 is a tablet computer with a display area 104 surrounded by bezel 106 and a control button 108. Host device 100 can have a wireless communication interface 110. (Although interface 110 is represented by an external antenna in FIG. 1, it is to be understood that all or part of any antenna or other hardware components of interface 110 can be physically located inside a housing of host device 100.) Wireless communication interface 110 can support data transfer between virtual ports defined by host device 100 and various external devices. Conventional or other wireless protocols can be used. In some embodiments, host device 100 can also provide a physical connection, e.g., via a multi-pin receptacle connector (not shown).

Accessory 102 can be any accessory capable of interacting with host device 100, such as a speaker dock or speaker system, a media console, an automobile head unit, a massage chair, a lamp, a garage door opener, or the like. Accessory 102 can have various user-interface components such as speakers 112, display 114, and user-operable controls 116. Accessory 102 can have a wireless communication interface 118. (Although interface 118 is represented by an external antenna in FIG. 1, it is to be understood that all or part of any antenna or other hardware components of interface 118 can be physically located inside a housing of accessory 102.) Wireless communication interface 118 can support data transfer between virtual ports defined by accessory 102 and various external devices. Conventional or other wireless protocols can be used. In some embodiments, accessory 102 can also provide a physical connection, e.g., via a multi-pin plug connector (not shown).

Wireless interfaces 110 and 118 can support wireless communication between host device 100 and accessory 102, e.g., using radio-frequency communication technology such as Wi-Fi or Bluetooth, near-field communication technology, infrared communication or the like. In some embodiments, a wired signal path can also be provided, e.g., using complementary connectors that may be present in the two devices. In some embodiments, multiple communication paths or channels can be concurrently established between host device 100 and accessory 102, with different types of information being selectively routed over different paths.

As shown in inset 120, host device 100 can provide a protocol stack to support communication with accessory 102. The protocol stack can include various application and operating system programs 122 that can implement functionality for the host device, including functionality that is interoperable with accessory 102. Session layer 124 can intermediate between programs 122 and lower layers to optimize communication of different types of information between programs 122 and accessory 102. Link layer 126 can separate or hide details of data transmission and reception from session layer 124, and port 128 can transmit and receive signals (via wired and/or wireless channels) to effect communication of data and/or messages 140.

As shown in inset 130, accessory 102 can provide a protocol stack to support communication with host device 100. This stack can be similar or identical to the host-side stack. In this instance, system functions 132 can be implemented in hardware and/or software (e.g., as application or operating system programs, accessory firmware, and/or dedicated logic circuits). Session layer 134 can intermediate between functions 132 and lower layers to optimize communication of different types of information between system functions 132 and host device 100. Link layer 136 can separate or hide details of data transmission and reception from session layer 134, and port 138 can transmit and receive signals (via wired and/or wireless channels) to effect communication of data and/or messages 140. The communication can be bidirectional.

The host-side and accessory-side protocol stacks can implement the same accessory protocol that can define message and/or packet formats, message parameters, and actions to be taken or effects to be produced in response to specific messages of the protocol. Examples of an accessory protocol and protocol stack are described below.

It will be appreciated that the host device and accessory of FIG. 1 are illustrative and that variations and modifications are possible. A host device and/or an accessory can implement any combination of functionality. In some embodiments, a host device and/or an accessory can have concurrent connections to multiple devices, e.g., using multiple physical or logical ports.

Figure 2:
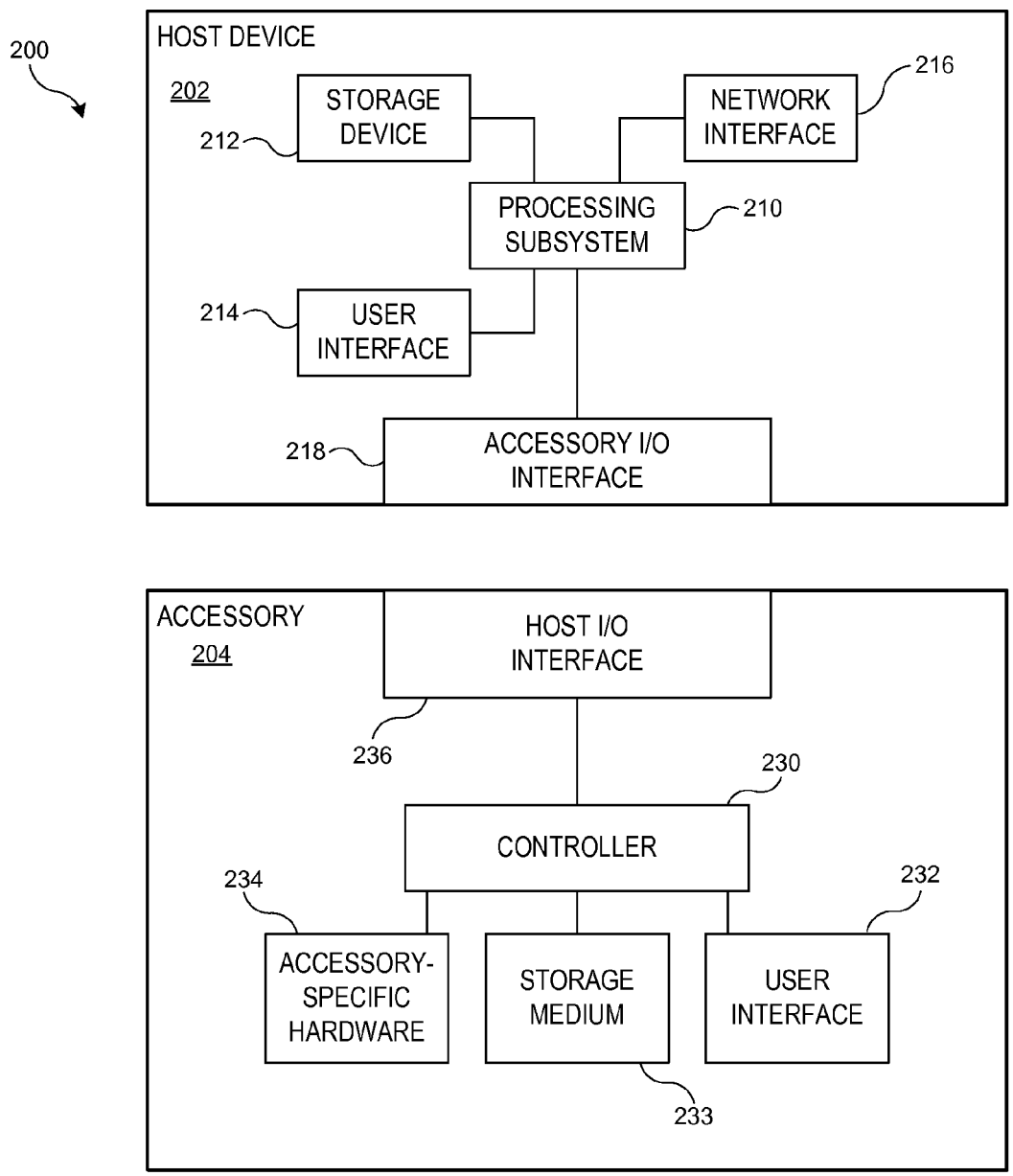
FIG. 2 is a simplified block diagram of a system including a host device and an accessory according to an embodiment of the present invention.

FIG. 2 is a simplified block diagram of a system 200 including a host device 202 and accessory 204 according to an embodiment of the present invention. In this embodiment, host device 202 (e.g., implementing host device 100 of FIG. 1) can provide computing, communication and/or media playback capability. Host device 202 can include processing subsystem 210, storage device 212, user interface 214, network interface 216, and accessory input/output (I/O) interface 218. Host device 202 can also include other components (not explicitly shown) such as a battery, power controllers, and other components operable to provide various enhanced capabilities.

Storage device 212 can be implemented, e.g., using disk, flash memory, or any other non-transitory storage medium, or a combination of media, and can include volatile and/or non-volatile media. In some embodiments, storage device 212 can store data objects such as audio files, video files, image or artwork files, information about a user's contacts (names, addresses, phone numbers, etc.), information about a user's scheduled appointments and events, notes, and/or other types of information. In some embodiments, storage device 212 can also store one or more application programs to be executed by processing subsystem 210 (e.g., video game programs, personal information management programs, media playback programs, etc.) and/or one or more operating system programs or other firmware to implement and support various device-level capabilities including a protocol stack to support communication with an accessory according to an accessory protocol.

User interface 214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 214 to invoke the functionality of host device 202 and can view and/or hear output from host device 202 via output devices of user interface 214.

Processing subsystem 210 can be implemented as one or more integrated circuits, e.g., one or more single-core or multi-core microprocessors or microcontrollers, examples of which are known in the art. In operation, processing subsystem 210 can control the operation of host device 202. In various embodiments, processing subsystem 210 can execute a variety of programs in response to program code and can maintain multiple concurrently executing programs or processes. At any given time, some or all of the program code to be executed can be resident in processing subsystem 210 and/or in storage media such as storage device 212.

Through suitable programming, processing subsystem 210 can provide various functionality for host device 202. For example, processing subsystem 210 can control a wireless transceiver (e.g., part of network interface 216 and/or accessory I/O interface 218) to detect accessories that can connect wirelessly to host device 202 (e.g., accessory 204). In response to detecting a connection from accessory 204, processing subsystem 210 can initiate various sessions for purposes of communicating with accessory 204 (or other accessories), and such communication can include parsing messages received from accessory 204. Processing subsystem 210 can also set up and maintain a link layer for managing communications between the sessions and one or more accessories. Examples of sessions and link layers are described below. Processing subsystem 210 can also execute other programs to control other functions of host device 202, including application programs that may be stored in storage device 212; in some embodiments, these application programs may include instructions that result in interactions with accessory 204, and processing subsystem 210 can execute such interactions using a protocol stack (e.g., as described below).

Network interface 216 can provide voice and/or data communication capability for host device 202. In some embodiments network interface 216 can include radio frequency (RF) transceiver components for accessing wireless voice and/or data networks (e.g., using cellular telephone technology, advanced data network technology such as 3G or EDGE, Wi-Fi (IEEE 802.11 family standards, or other mobile communication technologies, or any combination thereof); components for short-range wireless networking (e.g., using Bluetooth standards); components supporting proprietary wireless networking technologies such as custom mesh networks, direct wireless links, or the like; GPS receiver components; and/or other components. In some embodiments network interface 216 can provide wired network connectivity (e.g., Ethernet) in addition to a wireless interface. Network interface 216 can be implemented using a combination of hardware (e.g., driver circuits, antennas, modulators/demodulators, encoders/decoders, and other analog and/or digital signal processing circuits) and software components.

Accessory I/O interface 218 can allow host device 202 to communicate with various accessories. For example, accessory I/O interface 218 can support connections to a computer, an external keyboard, a speaker dock or media playback station, a digital camera, a radio tuner, an in-vehicle entertainment system or head unit, an external video device, a memory card reader, and so on. In some embodiments, accessory I/O interface 218 can support wireless communication (e.g., via Wi-Fi, Bluetooth, or other wireless transports). The same wireless transceiver hardware as network interface 216 can be used for both networking and accessory communication; for instance, as described below, a Wi-Fi network or other wireless network can be used as a transport for accessory-protocol messages. Additionally, in some embodiments, accessory I/O interface 218 can include a connector, such as connectors corresponding to the connectors used in various iPod®, iPhone®, and iPad® products, as well as supporting circuitry. Thus, accessory I/O interface 218 can support multiple communication channels, and a given accessory can use any or all of these channels.

Accessory 204 (e.g., implementing accessory 102 of FIG. 1) can include controller 230, user interface device 232, storage medium 233, other accessory-specific hardware 234, and host I/O interface 236. Accessory 204 is representative of a broad class of accessories that can interoperate with a host device, and such accessories can vary widely in capability, complexity, and form factor. Various accessories may include components not explicitly shown in FIG. 2, including but not limited to storage devices (disk, flash memory, etc.) with fixed or removable storage media; video screens; speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on. In addition, some accessories may provide an additional interface (not shown) that can connect to and communicate with another accessory.

Controller 230 can include, e.g., one or more single-core or multi-core microprocessors and/or microcontrollers executing program code to perform various functions associated with accessory 204. For example, where accessory 204 incorporates a user-operable control (e.g., controls 116 of FIG. 1), controller 230 can interpret user operation of the control and responsively invoke functionality of accessory 204; in some instances, the invoked functionality can include sending information to and/or receiving information from host device 202. Controller 230 can also implement a protocol stack to support communication with a host device according to an accessory protocol.

User interface 232 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 204, a user can operate input devices of user interface 232 to invoke functionality of accessory 204.

Storage medium 233 can incorporate any type of data storage media, including but not limited to disk, flash memory, or any other non-transitory storage medium, or a combination of media, and can include volatile and/or non-volatile media. Storage medium 233 can be used to store program code to be executed by controller 230, data objects received from host device 202, and any other data or instructions that may be generated and/or used in the operation of accessory 204. In some embodiments, storage medium 233 can include only volatile storage, e.g., for accessories that can boot by receiving code from another device, either point-to-point or via a network.

Accessory-specific hardware 234 can include any other components that may be present in accessory 204 to enable its functionality. For example, in various embodiments accessory-specific hardware 234 can include one or more storage devices using fixed or removable storage media; GPS receiver; a network interface; power supply and/or power management circuitry; environmental sensors (e.g., temperature sensor, pressure sensor, accelerometer, chemical sensor, etc.); and so on. It is to be understood that any type of accessory functionality can be supported by providing appropriate accessory-specific hardware 234.

Host I/O interface 236 can allow accessory 204 to communicate with host device 202. In some embodiments, host I/O interface 236 can support wireless communication (e.g., via Wi-Fi, Bluetooth, or other wireless transports) and can include appropriate transceiver and signal processing circuitry and software or firmware. Additionally, in some embodiments, host I/O interface 236 can include a connector that mates directly with a connector included in host device 202, such as a connector complementary to the connectors used in various iPod®, iPhone®, and iPad® products.

Accessory 204 can be any electronic apparatus that interacts with host device 202. In some embodiments, accessory 204 can provide remote control over operations of host device 202, or a remote user interface that can include both input and output controls (e.g., a display screen to display current status information obtained from host device 202).

Accessory 204 in various embodiments can control any function of host device 202 and can also receive data and/or control signals from host device 202. In other embodiments, host device 202 can control operations of accessory 204, such as retrieving stored data from a storage medium of accessory 204, initiating an image capture operation by a camera incorporated into accessory 204, etc. In some embodiments, accessory 204 can concurrently have communication channels with host device 202 and one or more other devices using the same protocol or different protocols as desired.

It will be appreciated that the system configurations and components described herein are illustrative and that variations and modifications are possible. The host device and/or accessory may have other capabilities not specifically described herein (e.g., mobile phone, global positioning system (GPS), broadband data communication, Internet connectivity, etc.).

Further, while the host device and accessory are described herein with reference to particular blocks, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 218 of host device 202 and host I/O interface 236 of accessory 204 allow host device 202 to be connected with accessory 204 and subsequently disconnected from accessory 204. As used herein, a host device and an accessory are "connected" whenever a communication channel specifically designated for accessory protocol communication is established between their respective interfaces and "disconnected" when the channel is terminated. Such connection can be achieved via direct physical connection, e.g., with mating connectors; indirect physical connection, e.g., via a cable; and/or wireless connection, e.g., via Wi-Fi or Bluetooth. In some embodiments, the communication channel for accessory protocol communication can piggyback on another transport (e.g., a wired or wireless power transport) or can include tunneling of accessory-protocol communications inside another protocol (e.g., an HTTP or HTTPS protocol).

In some embodiments, a host device and an accessory can communicate while connected by exchanging messages and data according to an "accessory protocol," which can be a proprietary or open protocol developed by a manufacturer of host devices (e.g., the iPod Accessory Protocol ("iAP") developed by Apple Inc.). The messages and data can be communicated, e.g., using a wireless transport medium provided by the relevant I/O interfaces. The accessory protocol can be largely or entirely transport-agnostic; that is, the same message and data formats can be used regardless of the transport medium (e.g., wired or wireless) or transport-level protocol that provides the channel via which accessory-protocol messages and data are exchanged. In some instances, the accessory protocol may specify a sequence of operations to establish a channel, and some or all these operations may be specific to a particular transport medium or transport-level protocol. Examples of sequences of operations to establish a wireless communication channel for accessory-protocol communication are described below.

The accessory protocol can define a "universe" of messages that can be exchanged between host device 202 and accessories connected thereto, such as accessory 204. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the packetizing of messages at a link layer. For instance, the accessory protocol may specify that a message is sent using one or more packets, each of which has a header and a payload. The header provides basic information (e.g., a start indicator; length of the packet; packet sequence number; identifier of a session with which the packet is associated, as described below), while the payload provides all or part of the message data. The packet can also include error-detection or error-correction codes as known in the art. The link layer can keep track of packets sent and/or received and can implement operations to verify packet delivery. For example, for received packets, the link layer can send acknowledgements, perform error checking, and request retransmission if an uncorrectable error is detected. For transmitted packets, the link layer can receive acknowledgements and can retransmit packets that were not acknowledged and/or for which the receiving device requests retransmission. These and other link-layer operations can be agnostic to packet content.

In some embodiments, the universe of messages defined by the accessory protocol can be logically grouped into a "general" message set and an "optional" message set. Every accessory and every host device that use the accessory protocol can be required to support at least the general message set. This message set can include messages enabling the host device and the accessory to identify and authenticate themselves to each other and to provide information about their respective capabilities, including which (if any) of the messages in the optional set each supports. For example, the general message set can include a "detect" message that the accessory can send to the host device to initiate accessory-protocol communication, a "request identify" message (or detect message) that the host can send to the accessory in response to the detect message to request that the accessory identify itself, and an identification message (or sequence of messages) that the accessory can send to the host to provide identifying information. Identification can include, for example, providing basic information about the accessory device such as manufacturer, model name, serial number, firmware version, device class information; listing specific messages in the optional message set that the device is capable of sending and/or receiving; providing information about input/output capabilities, encryption capabilities; and so on. The general message set can also include authentication messages that the host device can use to verify the purported identity and capabilities of the accessory (or vice versa), and the accessory (or host device) may be blocked from invoking certain (or all) of the optional messages if the authentication is unsuccessful.

The optional message set can include messages related to various functionalities that might or might not be supported in a given accessory. For example, the optional message set can include simple remote control messages that allow an accessory to identify a function of the host device to be invoked, remote user interface messages that can be used to obtain information related to replicating all or part of a user interface of a host device on an accessory (thereby supporting a more advanced remote control), messages that allow a user to control a radio tuner in an accessory by operating a host device and/or to control a radio tuner in a host device by operating an accessory, messages that facilitate transfers of data objects between the host device and the accessory, and so on. Any combination of optional messages can be defined in an accessory protocol, and there is no requirement that a given accessory or host device support all (or even any) of the optional messages.

Figure 3:
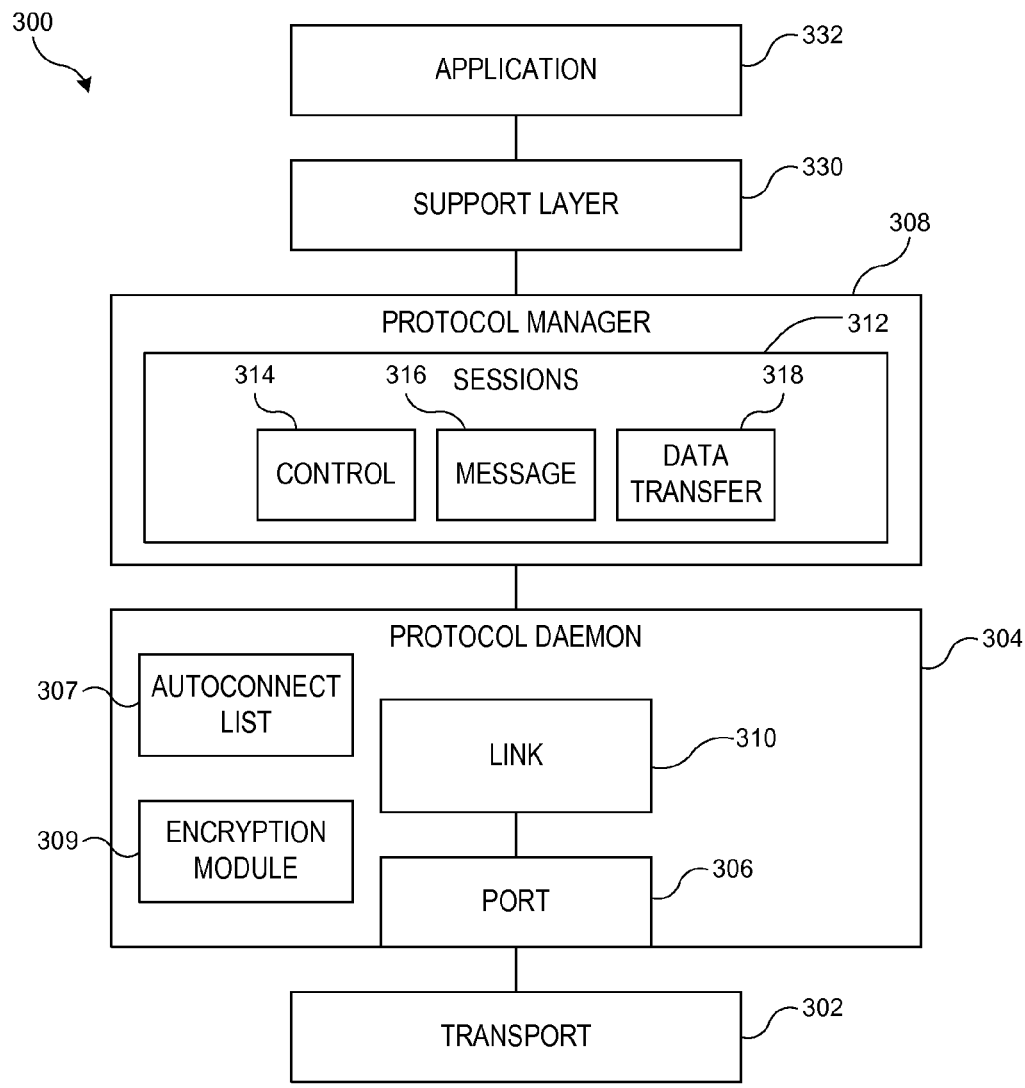
FIG. 3 is a block diagram showing further details of processes within a host device according to an embodiment of the present invention.

FIG. 3 is a block diagram showing further details of processes within host device 202 (or host device 101) according to an embodiment of the present invention. The various processes shown can correspond to programs executing in processing subsystem 210 of FIG. 2 and can provide a protocol stack 300 (e.g., implementing the protocol stack in inset 120 of FIG. 1). A similar protocol stack can be implemented in accessory 204 (e.g., implementing the protocol stack in inset 130 of FIG. 1). In some embodiments, multiple processor chips or multiple processor cores within a single chip can be used to implement the various processes. Some or all of the processors can be programmable general-purpose processors executing software and/or firmware programs, or some or all can be digital signal processors, state machines with built-in functionality, or any combination thereof. Protocol stack 300 can be used for accessory-protocol communication Physical transport 302 can include antennas, signal pins, drivers, digital-to-analog converters, encoders, RF circuitry, and other components operable to send and receive signals on a physical transport such as a pin, a wire, or an optical fiber; a wireless transport (e.g., an RF carrier wave); or the like. The particular details depend on the transport, and conventional or other transports can be used. In some embodiments, physical transport 302 implements a Wi-Fi transport and is capable of routing incoming and outgoing Wi-Fi communications to and from multiple different ports on the host device (including port 306 shown in FIG. 3); within the same host device, different ports can have different associated protocol stacks. Thus, for example, physical transport 302 can route to port 306 any incoming communications from an accessory with which an accessory-protocol connection to port 306 has been established and can route communications from other devices (e.g., a wireless-network access point such as a router) to other ports of the host device (not shown in FIG. 3). Examples of establishing connections to port 306 are described below.

Protocol daemon 304 can control accessory protocol communications by managing various physical or virtual ports. In some embodiments, protocol daemon 304 can define a port 306 corresponding to each established connection to an accessory. Although only one port 306 is shown, some embodiments allow multiple concurrent connections to accessories, and there can be multiple ports 306 connected to the same accessory or to different accessories. Each port 306 can interact with physical transport 302 (which can be the same transport or different transports for different ports 306) to send signals to and receive signals from an accessory connected on that port 306. In some instances, a virtual port 306 can be implemented as a software object (e.g., part of the device firmware); in other instances, port 306 can be connected to or associated with suitable communication hardware. For example, in the case of wireless communication, port 306 can be implemented as a software object to which physical transport 302 can selectively deliver incoming wireless signals that are addressed to port 306 and from which physical transport 302 can receive outgoing signals to be delivered wirelessly to other devices.

Protocol daemon 304 can extract inbound accessory-protocol messages received on port 306 (or any other active ports) and deliver them to a protocol manager 308. Protocol daemon 304 can also receive outbound accessory-protocol messages from protocol manager 308 and provide the messages to port 306 (or another active port) for delivery to an accessory connected to that port 306.

More specifically, protocol daemon 304 can include a link layer 310, which can be implemented as a software object (e.g., part of the device firmware) executing on appropriate hardware. In some embodiments, link layer 310 operates to create, send, receive, and read packets conforming the accessory protocol (e.g., as described above). For outbound communication, link layer 310 can receive a message from protocol manager 308, encapsulate the message into one or more packets, and send the packets via port 306 to physical transport 302. In some instances, e.g., where physical transport 302 implements Wi-Fi communication, physical transport 302 can encapsulate a link-layer packet (or a portion thereof) as the payload of a data packet that conforms to Wi-Fi or another wireless protocol.

For inbound communication, link layer 310 can receive a packet via port 306, extract the message, and provide the message to protocol manager 308 for processing. Where multiple ports 306 are connected, link layer 310 can manage the interleaving of communication across different connected ports 306, particularly where multiple ports share a common physical transport 302 (e.g., a wireless transport using an antenna common to all ports).

Protocol daemon 304 can provide additional functionality. For example, protocol daemon 304 can maintain an autoconnect list 307 that contains entries for accessories with which accessory-protocol communication should be initiated under various conditions, examples of which are described below. As another example, protocol daemon 304 can include an encryption module 309 that supports encryption and decryption of accessory-protocol messages at the link layer.

Protocol manager 308 can receive accessory-protocol messages from protocol daemon 304 and begin the process of interpreting the messages. Protocol manager 308 can receive all messages in the same format, regardless of port; thus the upper levels of the process stack shown in FIG. 3 can be isolated from the transport mechanism. Protocol manager 308 can deliver messages to a support layer 330 that acts as an intermediary between protocol manager 308 (and optionally other low-level device functions) and application 332, or in some instances directly to application 332.

Protocol manager 308 can include a session layer 312, which can be implemented as a software object (e.g., part of the device firmware) executing on appropriate hardware. Session layer 312 can operate to create and read messages conforming to the accessory protocol (e.g., the protocol described above). For outbound communication, session layer 312 can create a message, e.g., based on function calls from support layer 330 or directly from application 332, and provide the message to link layer 310 to be sent. For inbound communication, link layer 310 can provide a message extracted from a packet to session layer 312 for processing. Session layer 312 can interpret the message and send appropriate function calls to support layer 330 or directly to application 332.

In some embodiments, session layer 312 can create and define multiple sessions of different types, each adapted to handle different types of messages and data exchanges. Examples are shown in FIG. 3 as sessions 314, 316, 318. Each session can be assigned a unique session identifier (not shown) such that no two concurrently existing sessions in session layer 312 have the same session identifier. In some embodiments, session identifiers are assigned by the host device as sessions are created, and the host device can communicate the assigned session identifier to the accessory (e.g., via a message on an already-existing session). Different session types can be defined to process different subsets of messages in the accessory protocol, and in some embodiments, the subsets can overlap.

A control session 314 can be configured to process all messages associated with the general message set of the accessory protocol, such as identification and authentication of a connected accessory; control session 314 can also determine what other types of sessions are permitted to communicate with the accessory. This determination can be based on accessory identification and authentication, capabilities of the host device and so on. In some embodiments, control session 314 has a fixed identifier with a value specified by the accessory protocol; this can allow the host and accessory to create control sessions with matching session identifiers without having to expressly communicate the identifier value that will be used.

A message session 316 can be created to handle at least some of the messages from the optional message set of the accessory protocol. For example, many messages may include relatively small amounts of parameters and/or other data, and message session 316 can be used to create and read such messages.

A data transfer session 318 can be created in response to a request to transfer data between the host device and an accessory. Different types of data transfer sessions can be used, including, for example, buffer transfer sessions for discrete data objects (such as a file) whose size is known prior to beginning the transfer and streaming data sessions for open-ended data transfers where the size is not known in advance (e.g., streaming media or application-specific messages that are forwarded to and from applications 332).

It is to be understood that the particular session types described herein are illustrative and that other session types can be defined in addition to or instead of those shown in FIG. 3. In some embodiments, multiple sessions with the same accessory can operate concurrently, sharing access to port 306 via link layer 310.

In some embodiments with multiple ports 306, session layer 312 can define a different set of sessions for each connected port. Each session can have a globally unique session identifier (e.g., the control session associated with a first port and the control session associated with a second port can have different identifiers). In some embodiments, each received packet contains a session identifier, and link layer 310 can route extracted messages to a particular session based on the session identifier; likewise, link layer 310 can route different outgoing messages to different ports based on the session identifier of the message's source. Link layer 310 can maintain a mapping of session identifiers to ports, and session layer 312 can operate without knowledge of what ports are currently defined or being used for a particular session. It is to be understood that multiple session identifiers can be mapped to the same port. Where multiple session identifiers are mapped to the same port, link layer 310 can manage the interleaving of communications to and from different sessions, transparently to session layer 312.

For inbound communication, one of the sessions 314-318 within protocol manager 308 can receive accessory-protocol messages from protocol daemon 304 and begin the process of interpreting the messages. Protocol manager 308 can receive all messages in the same format, regardless of port; thus the upper levels of the process stack shown in FIG. 3 can be isolated from the transport mechanism. Protocol manager 308 can deliver messages to a support layer 330 that acts as an intermediary between protocol manager 308 (and optionally other low-level device functions) and application 332, or in some instances directly to application 332.

Application 332 can include one or more application programs implementing various functions of host device 202. Examples include an interface for navigating a database of media assets and for playing back assets of various types (e.g., audio, video, still images such as photos, etc.). Other examples include World Wide Web browsers, e-mail programs, personal information management applications (e.g., for managing calendar, tasks, contacts, etc.), geographic navigation programs (e.g., using GPS capability where present) and the like. Depending on implementation, application 332 can be part of an operating system of host device 202, a separate program pre-loaded onto host device 202, or a program loaded onto host device 202 by a user.

Some or all of the sessions in session layer 312 can be initiated and terminated on demand. For example, control session 314 can be initiated when a new connection is detected and port 306 is initialized. Control session 314 can be used to process identification and authentication messages received from the accessory and determine whether a message session 316 should be created or not. In some embodiments, control session 314 can remain active until such time as a disconnection or termination of port 306 occurs. Message session 316 can be created in response to control session 314 determining that message session 316 should be created, e.g., upon successful identification and/or authentication of an accessory. Once created, message session 316 can remain active until such time as a disconnection or termination of port 306 occurs or until such time as control session 314 determines that message session 316 should be terminated (e.g., because a new identification message is received from the accessory on port 306).

Other sessions can be initiated (or created) later, in response to specific events. For example, message session 316 can receive a message from the accessory or an application requesting transfer of a data object. In response, message session 316 can initiate a data transfer session 318 to transfer the data object. In some embodiments, message session 316 may be prevented from initiating data transfer session 318 if control session 314 determines that the connected accessory is not authorized to perform the requested data transfer. Data transfer session 318, once created, can begin the transfer of the data object and can terminate once the transfer is complete. If another transfer is subsequently requested, another data transfer session can be created.

It will be appreciated that the protocol stack described herein is illustrative and that variations and modifications are possible. Host device 202 can support any type of application, and applications can be launched or exited under control of a user or another process. It is contemplated that lower level processes (including support layer 330, protocol manager 308, and protocol daemon 304) can be implemented in software and/or firmware and configured to be automatically started at device power-up and to terminate only on power down or when various abnormal conditions are detected. In some embodiments, protocol manager 308 and protocol daemon 304 are always operating, but session layer 312, link layer 310, and port 306 are initiated only when a compatible accessory is detected and are terminated when no accessories are connected. The processes may go into inactive states to minimize resource consumption when not in use. Further, not all of the levels and processes shown herein are required; for instance, in some embodiments, applications might communicate directly with the protocol manager or protocol daemon. In other embodiments, processes shown as separate in FIG. 3 can be combined, or a single block in FIG. 3 can correspond to multiple processes executing on the device.

It is also to be understood that accessory 204 can implement a similar protocol stack. Communication requires that both host device 202 and accessory 204 have suitably configured hardware and/or software components to send and receive messages that are mutually comprehensible (e.g., conforming to the accessory protocol at both the link layer and the session layer), but the implementation may be varied as desired.

In the embodiment of FIG. 1, host device 100 and accessory 102 can exchange messages and data conforming to the accessory protocol using a wireless communication protocol such as Wi-Fi as a transport. In effect, the messages and data can flow through a wireless channel between host port 128 (e.g., corresponding to port 306 of FIG. 3) and accessory port 138.

In some embodiments, a host device (or an accessory) can provide multiple ports for different types of communication using a single wireless transport. In such embodiments, the sender of a communication (either the host or the accessory as the case may be) may need to indicate a particular port on the recipient device to which the communication should be delivered. In the case of accessory-protocol communication using stack 300 of FIG. 3, the accessory would need to provide a port identifier for port 306; accordingly, the accessory needs to know the port identifier for port 306 prior to sending accessory-protocol messages.

One option is to handle port identification statically. For example, the manufacturer of the host device can specify that a particular port number is assigned for accessory-protocol communications via a wireless transport, and accessory developers can program their accessories to use the assigned port number. Such static identification, however, may restrict the ability of the host device to provide multiple concurrent communication sessions. Accordingly, in some embodiments, a host device can assign port identifiers dynamically. That is, a port is assigned an identifier from a pool of available identifiers (e.g., numerical identifiers from 0 to 255) when it is created or opened. When the port is terminated or closed, its identifier can be returned to the pool.

Where the host device uses dynamic port identifiers, the accessory can be informed of the port identifier to which it should connect for purposes of accessory-protocol communication. In some embodiments, prior to initiating accessory-protocol communication between host device 100 and accessory 102, the Wi-Fi channel is established and configured such that accessory 102 can receive port-identifying information for the host device. Accessory 102 can then initiate accessory-protocol communication with host 100, e.g., by sending a detection message to the identified port. Specific examples of processes for establishing a connection to port 306 will now be described.

Figure 4:
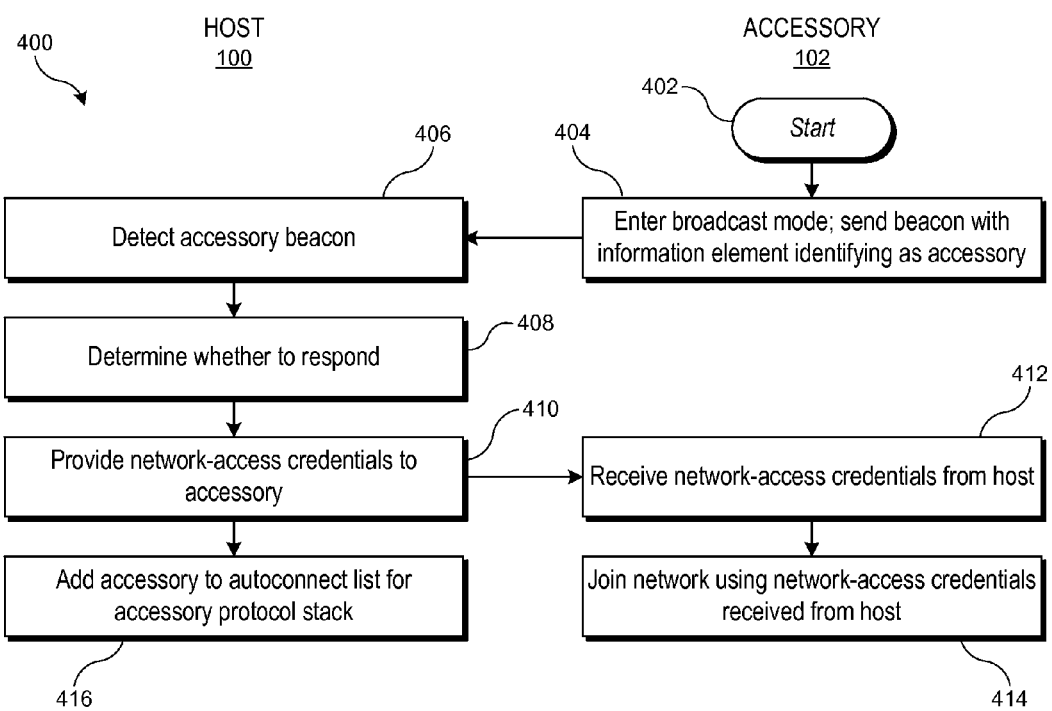
FIG. 4 is a flow diagram of a process for connecting an accessory to a network according to an embodiment of the present invention.

FIG. 4 is a flow diagram of a process 400 for connecting an accessory to a network according to an embodiment of the present invention. Host-side aspects of process 400 can be implemented, e.g., in transport module 302 and/or protocol daemon 304 of FIG. 3, and accessory-side aspects of process 400 can be implemented in the accessory's protocol stack.

At the start of process 400 (block 402), it is assumed that host device 100 is already connected to a wireless (e.g., Wi-Fi) network that has an access point (e.g., a router) and that the access point can restrict access to the network, e.g., by granting access only to devices that present the correct access credentials (e.g., a password). It is further assumed that accessory 102 has not yet been configured with the network access credentials. In process 400, accessory 102 can use a networking service (e.g., the Bonjour® service provided by Apple Inc. of Cupertino, Calif., or other zero-configuration networking services) to obtain the network access credentials from host device 100; at the same time, host device 100 can add accessory 102 to a list of known accessories (such as auto-connect list 307 of FIG. 3).

At block 404, accessory 102 can enter a broadcast mode and send out a beacon signal conforming to the networking service specifications. The beacon signal can include an identifier of the accessory (e.g., a MAC address or other unique identifier) and an information element indicating that the accessory supports accessory-protocol communication with host devices of a particular type. The host type can be specified broadly, e.g., any host that supports any version of a specific accessory protocol, or more narrowly, e.g., host devices of a particular category (tablet, phone, etc.) or having a specific capability (GPS, cellular data network connectivity, support for a particular accessory-protocol version or functionality, etc.). At block 406, host device 100 can detect the beacon signal.

Based on the information element, at block 408, host device 100 can determine whether to respond to the beacon. For instance, host device 100 can determine whether accessory 102 is an accessory with which it can interoperate. In some embodiments, at block 408 host device 100 can also notify the user that accessory 102 is attempting to join the wireless network and prompt the user to confirm that accessory 102 should be allowed to join, with the network-access credentials being sent to the accessory only if the user confirms.

If host device 100 determines that it should respond to the beacon, then at block 410, host device 100 can provide network-access credentials to accessory 102, and accessory 102 can receive the network-access credentials at block 412. The sending of network-access credentials can be managed in accordance with processes specified by the networking service (e.g., Bonjour) and may involve the exchange of multiple communications between host 100 and accessory 102. At block 414, accessory 102 can use the network-access credentials to join the wireless network.

At block 416, host device 100 can add an identifier of accessory to auto-connect list 307 that host device 100 maintains for controlling access to its accessory protocol stack 300. In some embodiments, auto-connect list 307 can be maintained by protocol daemon 304 or by other operating-system components of host device 100. Auto-connect list 307 can include entries for any number of accessories. Each entry can include a unique accessory identifier (e.g., the MAC address of the accessory, or accessory name and serial number, or the like). While the auto-connect list is optional, maintaining such a list can facilitate establishing accessory-protocol communication sessions without user intervention, e.g., as described below.

At the completion of process 400, host device 100 and accessory 102 are both connected to the same wireless network. However, before accessory protocol communication can occur via the wireless transport, the two devices need to find each other on the wireless network and identify specific destination ports for accessory-protocol communication, thereby defining the channel for accessory-protocol communication.

Figure 5:
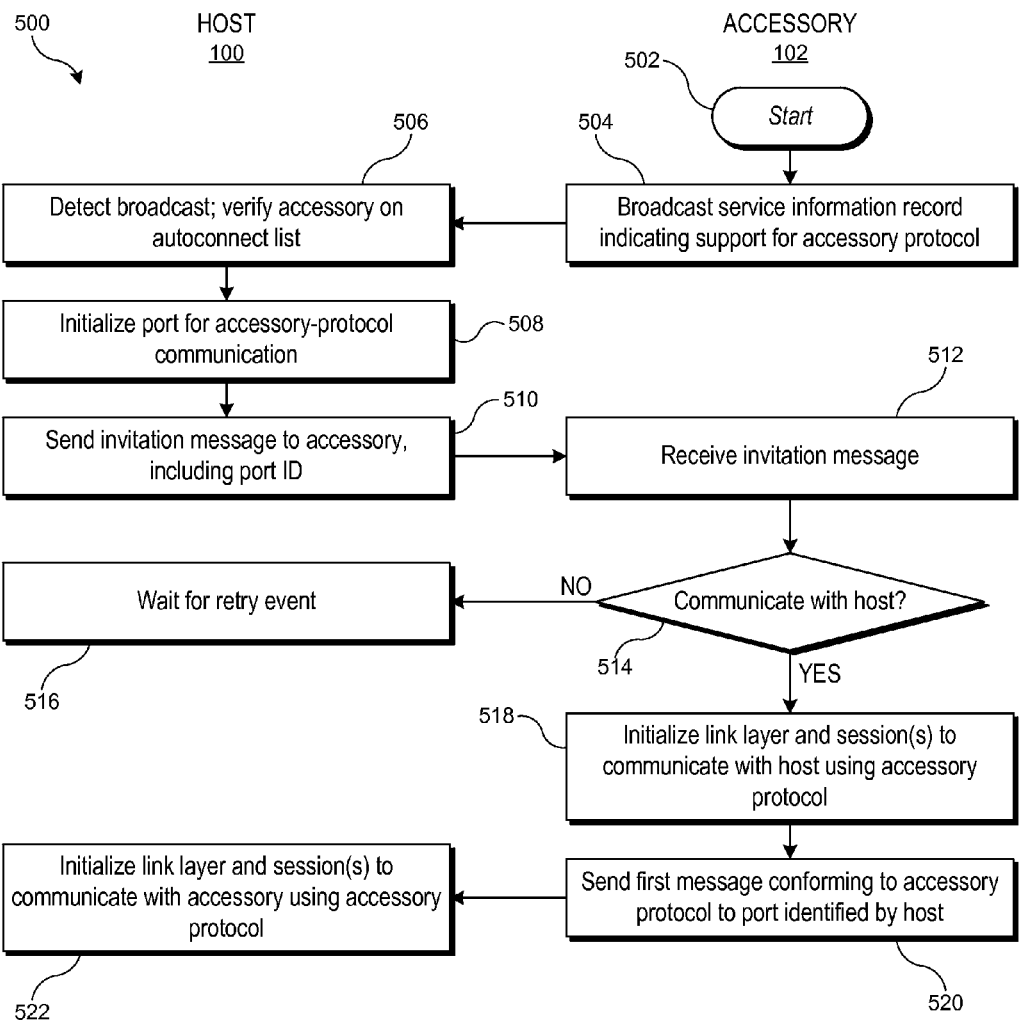
FIG. 5 is a flow diagram of a process for establishing a channel for accessory-protocol communication according to an embodiment of the present invention

FIG. 5 is a flow diagram of a process 500 for establishing a channel for accessory-protocol communication according to an embodiment of the present invention. Host-side aspects of process 500 can be implemented, e.g., in transport module 302 and/or protocol daemon 304 of FIG. 3, and accessory-side aspects of process 500 can be implemented in the accessory's protocol stack, which can be similar or identical to protocol stack 300 of FIG. 3.

Process 500 can start (block 502) at any time when accessory 102, having joined a wireless network, determines that an accessory-protocol communication channel should be established, assuming that a host can be found. At this stage, it is assumed that accessory 102 does not know what, if any, host devices are available to connect. In some embodiments, this can occur automatically when the accessory joins a wireless network (e.g., upon completion of process 400); in other embodiments, user input such as pushing a "connect" button on accessory 102 may be involved. At block 504, accessory 102 can broadcast a service information record on the wireless network indicating that it supports the accessory protocol. This record can be received by any host device that happens to be on the wireless network, such as host device 100, as well as by a network access point that manages the wireless directory and can maintain a store of information about devices on the wireless network.

At block 506, host device 100 can detect the service information record from accessory 102 and verify that the accessory is on the auto-connect list (e.g., it was previously added at block 416 of process 400). For example, host device 100 can compare the MAC address (or other accessory identifier) associated with the service information record with MAC addresses (or other accessory identifiers) on its auto-connect list and determine whether a match is found. In some embodiments, host device 100 can ignore broadcasts from accessories that are not on the auto-connect list. Such accessories can be connected manually, as described below.

Assuming that accessory 102 is on the auto-connect list, at block 508, host device 100 can initialize an accessory-protocol port (e.g., port 306) for communication with accessory 102. Initializing port 306 can include creating a virtual port 306, dynamically assigning a port identifier to port 306, and/or creating a socket to provide connectivity of transport 302 to port 306. At block 510, host device 100 can send an invitation message to accessory 102, indicating that host device 100 supports the accessory communication protocol and is available to connect to accessory 102. The invitation message can include the port identifier assigned to port 306.

At block 512, accessory 102 can receive the invitation, and at block 514, accessory 102 can determine whether to accept the invitation and initiate accessory-protocol communication with host 100. Various decision rules can be applied. For example, accessory 102 may receive invitations from multiple hosts in response to a broadcast, from which it can select one invitation to accept. As another example, accessory 102 may already be in communication with one host device when an invitation is received from another host device and may decide whether to accept the new invitation or continue communicating with first host device.

The particular decision rules are a matter of design choice and can take into account user expectations and the nature of a particular accessory. For example, if the accessory is a speaker dock that plays audio received from a host, it may be desirable to have the accessory accept the most recent invitation. This can facilitate a scenario where different users are using their host devices to play music through the speaker dock. In contrast, if the accessory is a massage chair that is controllable by a host device, it may be desirable to have the accessory decline invitations if it is already connected to one host, to prevent other users from disrupting a first user's massage. If two or more hosts issue invitations while the accessory is not connected to any host, the accessory can use a priority rule to select a host (e.g., first invitation wins, last invitation wins, most recently connected host wins). In some instances, an accessory that has sufficient user-interface capability can prompt the user to select the host whose invitation should be accepted.

If accessory 102 determines not to accept the invitation, it can either send a response informing the host or simply ignore the invitation. At block 516, host device 100 can wait for a retry event, which can be any event that results in a new invitation being issued. For instance, a user can initiate a manual connection attempt, as described below. In some embodiments, certain events may result in host 100 attempting to auto-connect again; examples are described below. In some embodiments, if no retry event occurs within a timeout period, host device 100 can close the port that was initialized at block 508, and process 500 can end.

If, at block 514, accessory 102 determines to accept the invitation, then at block 518, accessory 102 can initialize a link layer and one or more sessions (e.g., similar to FIG. 3) for communication with host 100. At block 520, accessory 102 can initiate accessory-protocol communication using the host port identifier specified in the invitation. For instance, in an embodiment described above, an accessory can initiate accessory-protocol communication by sending a "detect" message to the host, and block 518 can include sending this message to the specified host port.

In some embodiments, accessory 102 can implement dynamic port assignment. Where this is the case, accessory 102 can initialize a port for accessory-protocol communication prior to broadcasting its service information record, and host device 100 can direct the invitation (block 510) to that port. Alternatively, accessory 102 can initialize a port for accessory-protocol communication in response to determining (block 514) to accept an invitation and can send the initiation message (block 520) in a manner that identifies the accessory-protocol port as the sender. In either case, host device 100 receives the accessory's port identifier and can direct subsequent accessory-protocol communications from host port 306 to the designated accessory port.

At block 522, host device 100 can initialize its own link layer and sessions to communicate with accessory 102 using the accessory protocol. At this point, an accessory-protocol communication channel is established and communication can occur using the various messages defined by the accessory protocol, with the wireless network being used as a transport medium. For instance, the host and accessory can proceed with identification and authentication, then begin interoperating by exchanging additional messages.

Figure 6:
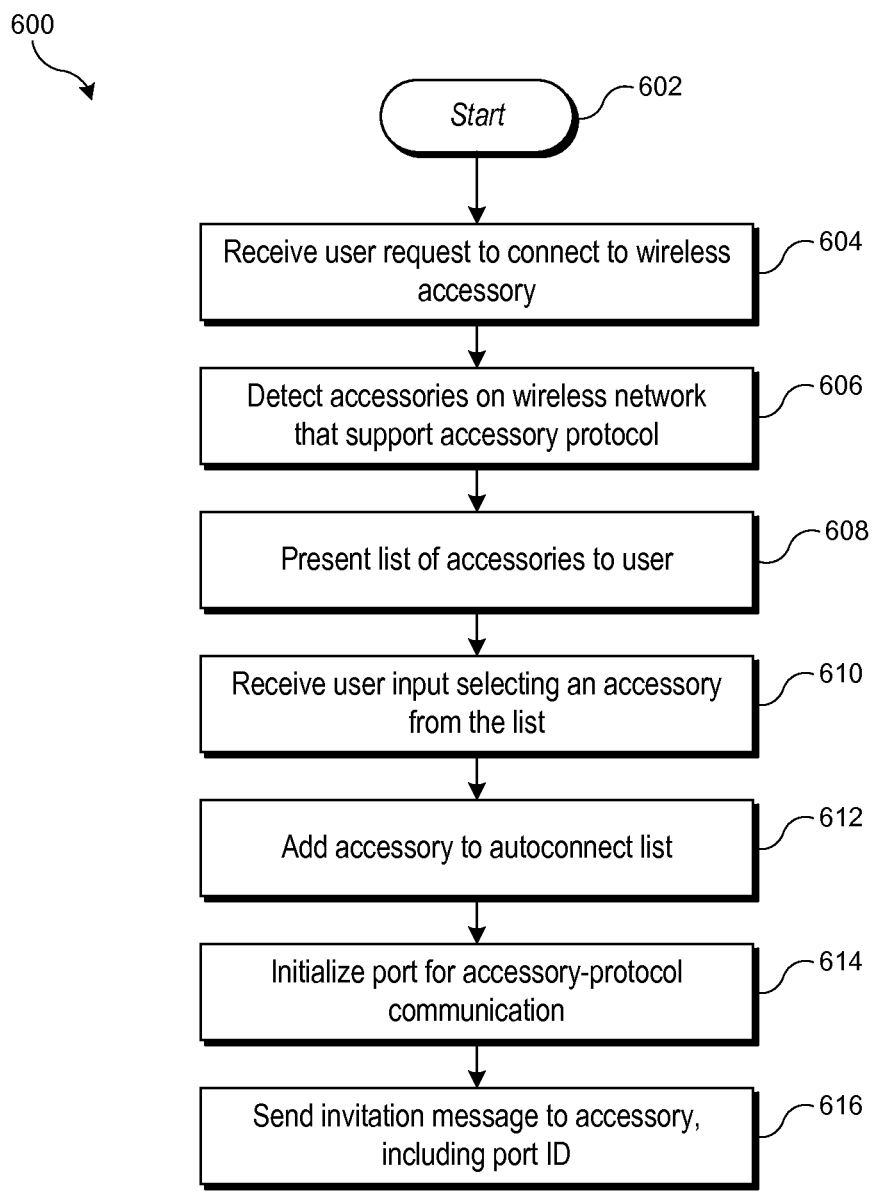
FIG. 6 is a flow diagram of a process for establishing an accessory-protocol communication channel according to an embodiment of the present invention.

As noted above, in some embodiments, establishment of an accessory-protocol communication channel can be manually initiated by a user of host device 100. FIG. 6 is a flow diagram of a process 600 for establishing an accessory-protocol communication channel according to an embodiment of the present invention. Process 600 can be implemented, e.g., in protocol stack 300 of host device 100. Process 600 can start (block 602) at any time when host device 100 is connected to a wireless network.

At block 604, host device 100 can receive a user request to connect to a wireless accessory. For example, host device 100 can include a user interface that provides a "settings" menu, and within the settings menu can be a user-selectable option to connect to a wireless accessory. At block 606, host device 100 can detect any accessories that are present on the wireless network to which it currently belongs and that support accessory-protocol communication. For example, host device 100 can listen for broadcasts of service information records by accessories on the network (e.g., similar to the broadcast at block 504 of process 500), or host device 100 can query a network access point that maintains a directory of service information for devices on the network.

At block 608, host device 100 can present a list of detected accessories to the user. In this example, an accessory can be included in the list regardless of whether it is on the auto-connect list of host device 100. At block 610, host device 100 can receive a user selection of a specific accessory (e.g., accessory 102) as the accessory to which a connection should be made. At block 612, host device 100 can add an entry for accessory 102 to its auto-connect list if it is not already listed, so that subsequent reconnection can occur without user intervention (e.g., by using process 500). In some embodiments, block 612 can include prompting the user to confirm that accessory 102 should be added to the auto-connect list.

At block 614, host device 100 can initialize a port, similarly to block 508 of process 500, and at block 616, host device 100 can send an invitation message to accessory 102, similarly to block 510 of process 500. From this point, establishing the connection can proceed as in process 500, with the accessory determining whether to respond to the invitation and the accessory-protocol communication channel being established only if the accessory accepts the invitation. In some embodiments, host device 100 can defer adding an entry for accessory 102 to its auto-connect list until the invitation is accepted and a connection is made.

It will be appreciated that the configuration and connection processes of FIGS. 4-6 are illustrative and that variations and modifications are possible. Steps described as sequential may be executed in parallel, order of steps may be varied, and steps may be modified, combined, added or omitted. Any of the processes can be implemented independently of the others. For instance, the channel-establishment processes of FIGS. 5 and/or 6 can be performed between a particular host and accessory regardless of whether the accessory previously obtained network-access credentials from that host device or some other source. Once an accessory has obtained and stored network-access credentials for a particular network, the accessory can drop off and rejoin the network at will using the stored credentials for as long as they remain valid. Thus it is contemplated that process 400 can be performed independently of process 500 or 600.

Auto-connection as described with reference to process 500 can be used to allow a host device to automatically reconnect with an accessory any time the two become present on the same network. This can be convenient for users, as they can use accessories without manually establishing a connection each time. For instance, when a user's phone (an example of a host device) joins its home Wi-Fi network, the phone can automatically connect to a wireless speaker system, TV, massage chair, or other accessory that "lives" (is present in) in the home, allowing the user to play media content or perform other operations without first having to connect. While auto-connection can be a helpful feature, the use of an auto-connect list and any automatic reconnection to accessories is optional. In some embodiments, a user may be able to enable or disable auto-connect functionality for a particular host device, either globally or on a per-accessory basis, e.g., using a suitably configured settings menu to specify the desired behavior.

Auto-connection can occur in response to various events. One example, described above, is where an accessory that joins a network is recognized by the host as being on the host's auto-connect list. Another example can occur when a host device is powered up or rebooted; as part of the boot sequence, the host device can automatically join a preferred wireless network (assuming such a network is available) and look for accessories on the network that are on its auto-connect list. As another example, a host device can look for accessories with which to auto-connect when the host device joins a wireless network (e.g., when a user who has a home Wi-Fi network brings the host device home) or when the wireless transceiver is powered up after being powered down.

It should be noted that in processes 500 and 600, accessory 102 waits to receive an invitation from host device 100 rather than actively searching for a host device (or for an accessory-communication port on a host device). This allows host device 100 to maintain control over whether a connection is established, even though it is accessory 102 that initiates the accessory-protocol communication. Accordingly, accessory protocol communication occurs only if both devices agree to connect: the host "agrees" by sending an invitation to a specific accessory identifying the port to use, and the accessory "agrees" by initiating accessory-protocol communication with the port in response to the invitation.

In some embodiments, each invitation message can be flagged as to whether it was generated based on an auto-connection rule (e.g., process 500) or an express user request (e.g., process 600). If an invitation based on a express user request is declined by the accessory, the host device can alert the user. If an invitation generated based on auto-connection is declined, the host device can determine not to alert the user. Thus, if a connection the user has specifically requested fails to be established, the user is informed, while failure of an auto-connection can be transparent to the user. If the user wants the host device to interoperate with an accessory that did not connect through the auto-connect process (e.g., process 500), the user can initiate a manual connection (e.g., process 600).

In embodiments described above, auto-connection can be implemented selectively. This can reduce the likelihood of a host device making a connection that a user does not want, as well as avoiding a situation where the host device keeps prompting the user to connect to various accessories that may appear on a network with the host device (which can detract from the user experience). For instance, if process 400 includes the host device obtaining user confirmation that the accessory should be added to the network, this confirmation can serve as an indication that the user intends to connect the host device to the accessory, and there is no need for the host device to prompt the user again in process 500.

If the user does not confirm to a particular host device that an accessory should be added to the network, that host device can assume the user is not interested in connecting that host device to the accessory. Similarly, as described above with reference to process 600, when a user manually instructs a host device to connect to a particular accessory, the host device can add that accessory to the auto-connect list, so that future connections to that accessory can occur without a manual instruction from the user. This type of auto-connect behavior can provide a pleasant user experience. For instance, the user is not barraged with prompts to connect to various accessories, as such prompts occur under conditions that are expected to occur relatively infrequently (e.g., only for initial configuration of a new accessory). The user-accessible menu of accessories currently on the network allows the user to decide when to initiate connections to accessories that aren't automatically connected. At the same time, the user is not required to repeatedly instruct the host device to connect to the same accessory. Further, as noted above, some embodiments may provide customization menus that allow the user to specify desired auto-connect behavior in detail if the user is so inclined.

Once an accessory-protocol communication channel is established, communication can continue indefinitely, until such time as the channel is closed. For example, the channel may close if either host 100 or accessory 102 drops off the wireless network for any reason. As another example, a user can instruct host 100 or accessory 102 to close the channel (e.g., via a user interface that provides a "Disconnect" control). When the channel is closed, a cleanup operation can be performed to free up resources and/or deter unwanted connections. The cleanup operation can include terminating or closing port 306 and/or its associated socket. In some embodiments, if the link layer implements a connection-based protocol such as TCP, loss of connection is readily detectable at the link layer, and appropriate cleanup action can be taken. However, the link layer may use a connectionless protocol such as UDP or the like, and loss of connection may not be as readily detectable. For example, the accessory may disconnect from a host device while remaining on the same wireless network (e.g., because the accessory accepts an invitation to connect from a different host device).

In some embodiments, a host or accessory that is intentionally closing the channel can send a "terminate connection" message of the accessory protocol to the other device prior to closing the channel. For example, host 100 might send a "terminate connection" message if it is entering a sleep state or if the user has operated a "Disconnect" control; accessory 102 might send a "terminate connection" message if it is being powered down or if it decides to accept a connection from a different host device (and cannot maintain both connections). Receipt of a "terminate connection" message can indicate that the channel is being closed, allowing the recipient device to perform cleanup operations. It is to be understood that, depending on specific circumstances, it is always possible that a channel might be closed without a "terminate connection" message being sent, or a "terminate connection" message that is sent might not be received. Thus, a host or accessory need not assume that a channel remains connected just because no "terminate connection" message has been received.

Figure 7:
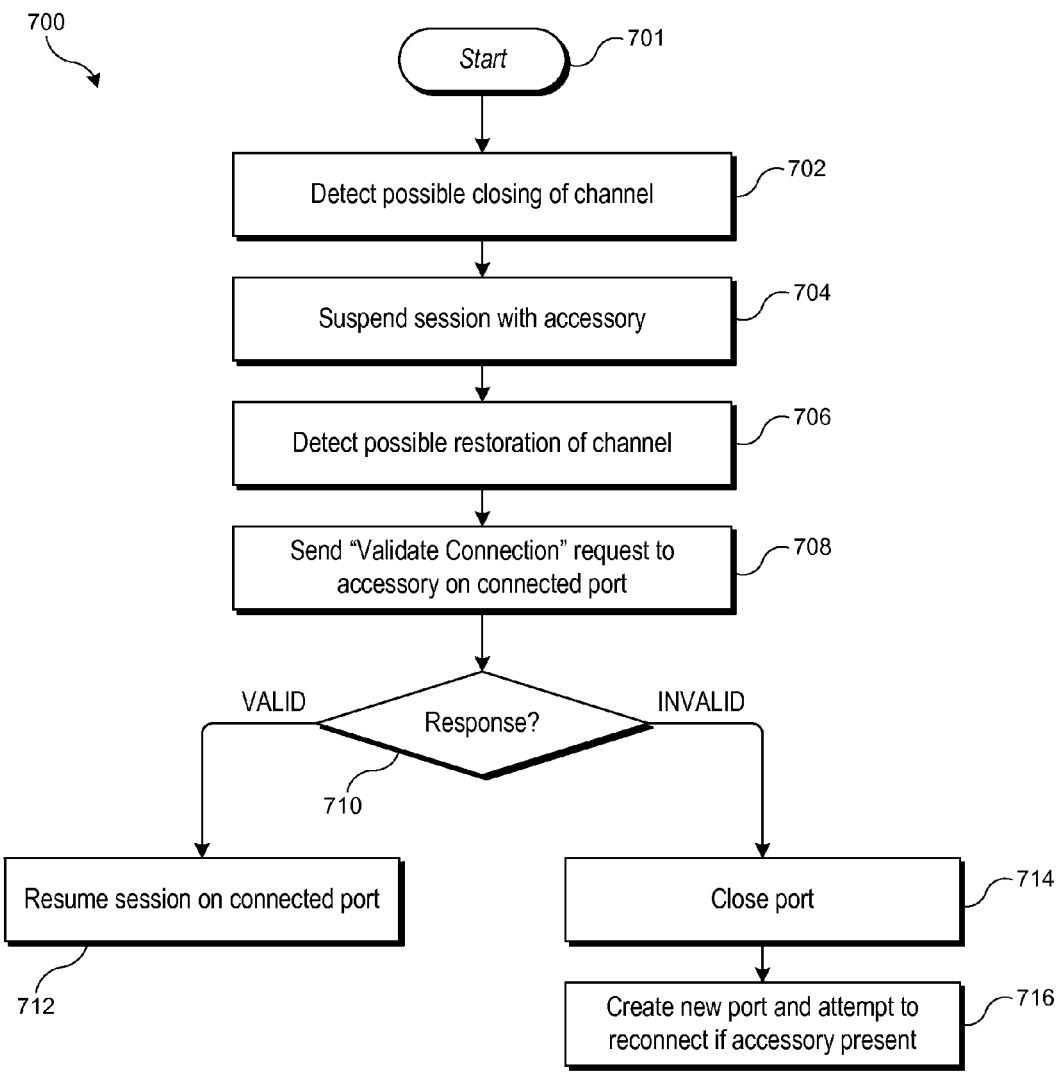
FIG. 7 is a flow diagram of a process for testing a connection according to an embodiment of the present invention.

FIG. 7 is a flow diagram of a process 700 for testing a connection according to an embodiment of the present invention. Process 700 can be implemented, e.g., in host device 100 within protocol stack 300 or the like. Process 700 can begin (block 701) while host device 100 has an accessory-protocol communication channel connected to accessory 102. At block 702, host device 100 can detect a possible closing or loss of the channel. For example, host device 100 may monitor a networking service (e.g., Bonjour service), and a loss of connectivity to this service may also indicate loss of connection to other devices. When a possible loss of the channel occurs, host device 100 can suspend communication with the accessory at block 704; in this example, the ports and any associated sockets are not terminated in case the connection can be recovered.

At block 706, host device 100 can detect restoration of connectivity. At block 708, host device 100 can send a "validate connection" message to accessory 102 via the port (e.g., port 306) to which accessory 102 was connected. The "validate connection" message can be defined within the accessory protocol and sent as any other accessory-protocol message. The accessory protocol can require that an accessory that receives a "validate connection" message should respond within a specific time (e.g., 5 seconds) by sending an acknowledgement response. In some embodiments, the acknowledgement response may include an accessory identifier, digital certificate, digitally signed data or other information usable to confirm that the accessory is the same accessory that was previously connected.

At block 710, host device 100 can determine whether a valid response is received from accessory 102. If so, then at block 712, host device 100 can resume the session with accessory 102. If an invalid response (or no response within the timeout period) is received, then at block 714, host device 100 can close or terminate the virtual port and any associated socket. If accessory 102 is present on the network, then at block 716, host device 100 can attempt to reconnect, e.g., by creating a new port and sending a new invitation to connect to accessory 102. In some embodiments, reconnection at block 716 is automatically attempted only if accessory 102 is on the auto-connect list maintained by host device 100.

It will be appreciated that process 700 is illustrative and that variations and modifications are possible. Steps described as sequential may be executed in parallel, order of steps may be varied, and steps may be modified, combined, added or omitted. For instance, a number of events may trigger host device 100 to send a validate connection message, including any event that leaves the state of the channel uncertain. In some embodiments, accessory 102 can also generate a validate connection message to host device 100 if it suspects the channel may have been disconnected.

In some instances, loss of connectivity may automatically trigger closing a port, without first attempting to validate the connection. For example, if the accessory ceases to respond to application protocol messages sent by the host (or vice versa), the host (or accessory) can terminate the connection and close its port. In some embodiments, the link layer at either end can send acknowledgements of messages received, and failure to receive acknowledgments after some number of sent messages can indicate that the other device has ceased to communicate on the channel.

As another example, the host device's wireless transceiver may be powered down due to various events, such as the device entering a sleep state or off state or "airplane" mode (RF transceivers turned off) or the like; in some instances, the transceiver may also be powered down or otherwise inactivated to allow use of other RF communication protocols (e.g., a mobile telephony network). When transceiver power-down occurs, all virtual ports and associated sockets can be terminated. When the wireless transceiver is powered up again, the host device can automatically create new virtual ports and attempt to reestablish connection with any accessories to which it had active channels at the time of power-down. In some embodiments, the host device automatically attempts to reestablish connections only if the accessory is on the host's auto-connect list; in other embodiments, a host device can store information about what accessory connections it had at the time the transceiver was powered down and can attempt to reestablish those connections regardless of whether the accessory is on the host's auto-connect list.

As still another example, the accessory protocol can provide a framework for delivering arbitrary communications between an application (e.g., application 332 of FIG. 3) executing on host device 100 and a connected accessory. Such communications can be delivered, e.g., using data transfer session 318 of FIG. 3, which provides for content-agnostic data transfer using protocol manager 308 and protocol daemon 304. The content of the communication can conform to an application-specific protocol that is understood by application 332 and accessory 102 (or some component thereof). For instance, an application-specific protocol might be used together with a suitable application 332 to provide a user interface on host device 100 for controlling a special-purpose accessory such as a massage chair.

In some embodiments, when host device 100 launches an application 332 that uses an application-specific protocol, host device 100 can automatically determine whether any accessories that support the same application-specific protocol are present on the network and attempt to connect to such accessories. For instance, the identification information provided by accessory 102 using the accessory protocol can include information identifying any application-specific protocols or particular applications that the accessory supports or prefers. Host device 100 can store this information, e.g., in the auto-connect list entry for accessory 102. When an application that supports an application-specific protocol is launched, host device 100 can use the auto-connect list to identify a known accessory that prefers or supports that application or application-specific protocol. If such an accessory is present on the wireless network, host device 100 can attempt to connect to the accessory (e.g., by sending an invitation message as described above).

Wireless networks such as Wi-Fi networks can implement various security measures (e.g., data encryption and requiring network-access credentials), and these can help to secure accessory-protocol communications that are sent wirelessly against interception, spoofing, and other hazards. In some embodiments, an additional layer of security can be implemented within the accessory protocol. For example, the link layer can support encryption of the content of packets it sends (and correspondingly decryption of the content of packets it receives), e.g., using encryption module 309 of FIG. 3. Encryption can be implemented or not on a per-connection basis and can depend on whether both the accessory and the host support link-layer encryption.

Figure 8:
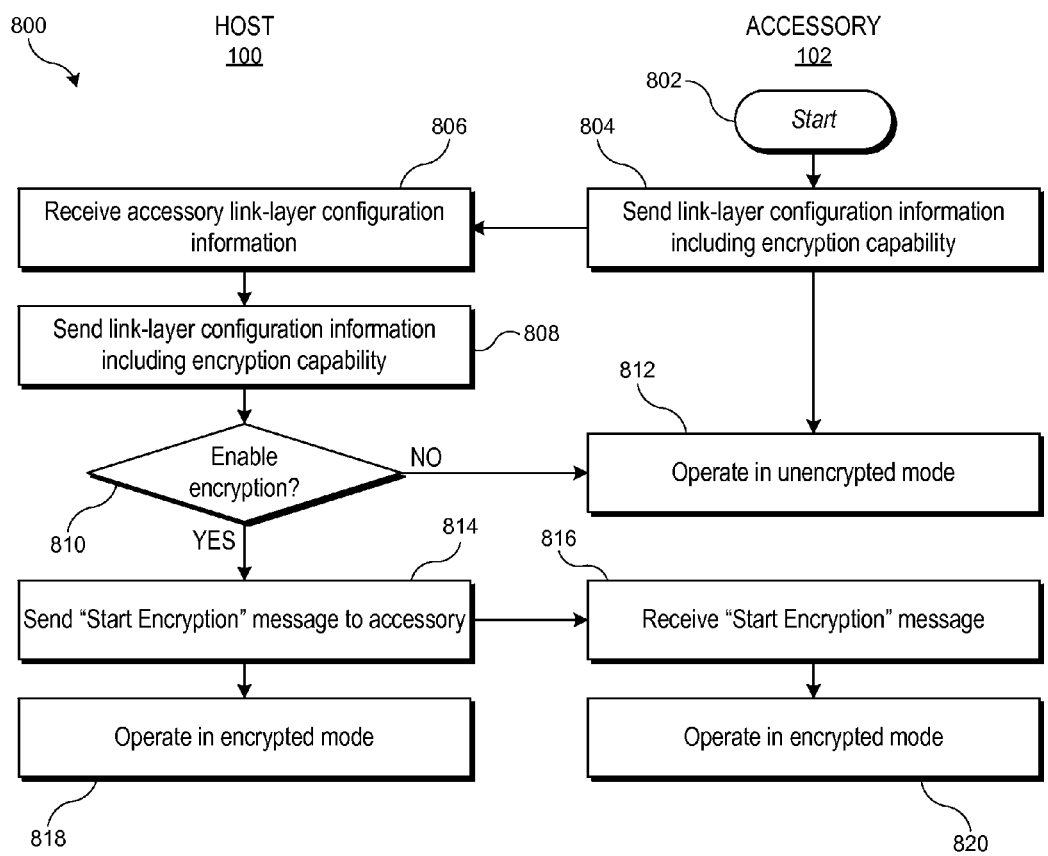
FIG. 8 is a flow diagram of a process for determining whether to use link-layer encryption according to an embodiment of the present invention

FIG. 8 is a flow diagram of a process 800 for determining whether to use link-layer encryption according to an embodiment of the present invention. Process 800 can start (block 802) after host 100 and accessory 102 have established an accessory-protocol communication channel (e.g., using process 500 or 600 described above). As part of its identification information, accessory 102 can send link-layer configuration information, including an indication of whether it has link-layer encryption capability, at block 804. At block 806, host device 100 can receive this information. At block 808, host device 100 can send its own link-layer configuration information, which can include an indication of whether it has link-layer encryption capability. The link-layer configuration information sent by either or both devices can also specify other properties of the link layer such as the size of a buffer that receives messages (which can be used by the sender to prevent overflow), the maximum number of messages that will be received before sending an acknowledgement, and so on.

At block 810, host device 100 can determine whether to enable encryption at the link layer. In some embodiments, host device 100 implements a policy of enabling link-layer encryption for any connection where both host device 100 and accessory 102 support link-layer encryption. In other embodiments, additional criteria may be incorporated into the decision. Any criteria relevant to assessing the risk associated with unencrypted communication can be used, and the decision can involve weighing risks against the processing-resource cost of using encryption. Examples of relevant criteria include information about the particular messages accessory 102 intends to use (which can be provided during accessory identification as described above) or information about the type of accessory 102 that is connected.

Until and unless host device 100 determines that link-layer encryption should be enabled, accessory 102 (and host device 100) can operate by default in unencrypted mode at block 812. If, at block 810, host device 100 determines not to enable link-layer encryption, accessory 102 (and host device 100) can continue to communicate in the unencrypted mode. ("Unencrypted mode" in this context means that link-layer encryption is not employed; encryption may be employed at other layers, such as by the wireless network that serves as a transport.)

If host device 100 determines that link-layer encryption should be enabled, then at block 814, host device 100 can send a "start encryption" message conforming to the accessory protocol to accessory 102, and accessory 102 can receive the message at block 816. Thereafter, at blocks 818, 820, both devices can switch to operating in encrypted mode. In some embodiments, operating in encrypted mode may include exchanging information that allows each device to establish a shared secret. The shared secret can be used to generate a session key, and the session key can be used to encrypt subsequent communications. In embodiments where the accessory protocol provides for accessory authentication using a digital certificate and a public/private key pair, this key pair can be used to encrypt some or all of the information that is exchanged to establish the shared secret. Conventional or other encryption algorithms can be used to generate a session key and use it to encrypt messages; symmetric or asymmetric algorithms can be used as desired. Such algorithms can be implemented, e.g. within encryption module 309 of FIG. 3 and invoked by link layer 310.

It will be appreciated that process 800 described herein is illustrative and that variations and modifications are possible. Steps described as sequential may be executed in parallel, order of steps may be varied, and steps may be modified, combined, added or omitted. Host device 100 can decide to initiate encryption at any time, not just when the link layer is configured. In some embodiments, once encryption is enabled for a given connection, it remains enabled for the duration of that connection; in other embodiments, encryption can be started and stopped (and restarted) within a single connection. Encryption at the link layer may be applied to all accessory-protocol messages or selectively applied to certain messages (e.g., to messages intended for specific sessions but not for other sessions), as long as both devices know which messages are or are not encrypted.

In some embodiments, if accessory 102 does not support link-layer encryption, host device 100 can limit the functionality to which accessory 102 is granted access. For example, an accessory that does not support link-layer encryption may be permitted to send remote control commands to start and stop media playback of media assets stored on or otherwise accessed by host device 100 but not to receive digital media content or other information about the media assets (e.g., descriptive metadata such as titles, artist identifiers, associated artwork, or the like).

Further, process 800 is not dependent on any particular communication channel and can be used with wireless and/or wired communication channels as desired.

As described above, an accessory and a host device can communicate using an accessory protocol that is transported over a wireless communication network such as a Wi-Fi network. The network can function as a transport or channel between a virtual port of the host device and a corresponding port of the accessory. The channel is established upon the agreement of both devices: for instance, the host device can provide a port identifier to the accessory, and the accessory can respond with a message initiating accessory-protocol communication with that port. A host device can selectively make connections to accessories automatically and can automatically reconnect to accessories. In addition, messages can be selectively encrypted at the link layer to provide enhanced security, particularly when messages are being transmitted wirelessly.

While the invention has been described with respect to specific embodiments, one skilled in the art will recognize that numerous modifications are possible.

In some instances, a host device can have multiple concurrent wireless connections to accessories, for instance by creating multiple virtual ports. Different virtual ports can connect to different accessories or to different ports of the same accessory. In some embodiments, a host can determine whether to connect to an accessory based at least in part on what (if any) accessories are already connected. For instance, it may not be desirable for a host to be concurrently connected to two different accessories that receive media streams if the host can support only one output media stream at a time, or it may not be desirable for a host to be concurrently connected to two different remote control accessories due to the risk of conflicting control instructions being received.

Further, due to resource constraints, the number of virtual ports that can concurrently exist on a host device may be limited. If a host is already using the maximum number of virtual ports, it can ignore any broadcasts from other accessories looking for hosts with which to connect, or the host can prompt the user to select an accessory to disconnect in order to allow a new connection.

Although the description above assumes that an accessory connects to one host device at a time, it is also possible for an accessory to have multiple ports operating concurrently and multiple concurrent connections to the same host and/or to different hosts. An accessory that can interact with multiple hosts concurrently can include control logic capable of managing communications from multiple ports and/or hosts. An accessory with multi-port capability can determine whether to accept an invitation from a host based in part on what (if any) host is already connected.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of establishing a wireless communication channel between a host device and an accessory, the method comprising:

joining, by the host device, a wireless network;

detecting, by the host device, a service information record from the accessory via the wireless network, the service information record including an accessory identifier and an indication that the accessory supports an accessory protocol;

determining, by the host device, whether an accessory-protocol communication channel should be established with the accessory;

in the event that an accessory-protocol communication channel should be established with the accessory:

sending, by the host device via the wireless network an invitation message to the accessory, the invitation including an address of the host device and a dynamically assigned port identifier for a virtual port of the host device to be used for accessory protocol communication with the accessory;

receiving, at the virtual port, a detection message from the accessory, the detection message being a message defined by the accessory protocol as indicating that the accessory is initiating accessory-protocol communication with the host device; and in response to the detection message, initializing, by the host device, a protocol stack for accessory protocol communication with the accessory, the protocol stack being connected to the virtual port, the protocol stack including a link layer; and after initializing the protocol stack:

receiving, at the virtual port, an identification message conforming to the accessory protocol from the accessory, the identification message indicating whether the accessory supports encryption of accessory protocol messages at the link layer of the protocol stack;
determining, by the host device, whether to operate in an encrypted mode, the determination being based on the identification message; and
in response to determining that the host device is to operate in the encrypted mode:
sending, by the host device, a start-encryption message to the accessory, the start-encryption message conforming to the accessory protocol; and
encrypting, by the host device, one or more outgoing accessory protocol messages sent to the accessory after sending the start-encryption message, the encryption being performed at the link layer of the protocol stack.

2. The method of claim 1 further comprising, in the event that an accessory-protocol communication channel should be established with the accessory:
creating, by the host device, the virtual port; and
assigning, by the host device, the port identifier to the virtual port.

3. The method of claim 1 wherein determining whether the accessory-protocol communication channel should be established with the accessory includes determining whether the accessory is on an auto-connect list maintained by the host device.

4. The method of claim 3, further comprising, prior to detecting the broadcast message:
detecting, by the host device, a beacon transmission from the accessory, the beacon transmission requesting a network-access credential, the beacon transmission further including an accessory identifier and an indication that the accessory supports the accessory protocol; and
in response to the beacon transmission:
communicating, by the host device, the network access credential for the wireless network to the accessory; and
adding, by the host device, the accessory identifier to the auto-connect list.

5. The method of claim 1 wherein determining whether the accessory-protocol communication channel should be established with the accessory includes receiving, by the host device, a user input indicating that the host device should connect to the accessory.

6. The method of claim 5 further comprising:
presenting, by the host device, a user-readable list of accessories that are present on the wireless network,
wherein receiving the user input includes receiving a user selection from the user-readable list.

7. The method of claim 5 further comprising:
in response to the user input, adding, by the host device, an identifier of the accessory to an auto-connect list maintained by the host device.

8. The method of claim 1 further comprising:
subsequently to sending the start-encryption message, ignoring, by the host device, an incoming accessory protocol message received at the port that is unencrypted.

9. The method of claim 1 further comprising, in response to determining that the host device is not to operate in the encrypted mode:
determining, by the host device, a subset of a universe of accessory protocol messages that are acceptable in unencrypted form; and
ignoring, by the host device, a received accessory protocol message that is not in the subset.

10. A method of establishing a wireless communication channel between a host device and an accessory, the method comprising:
joining, by the accessory, a wireless network;
broadcasting, by the accessory, a service information record via the wireless network, the service information record including an accessory identifier and an indication that the accessory supports an accessory protocol;
receiving, by the accessory, an invitation message from a host device on the wireless network, the invitation message including an address of the host device and a port identifier for a virtual port on the host device to be used by the accessory for accessory-protocol communication with the host device;
determining, by the accessory, whether the invitation message should be accepted;
in response to determining that the invitation message should be accepted:
sending, by the accessory, a detection message to the virtual port of the host device, the detection message being a message defined by the accessory protocol as indicating that the accessory is initiating accessory-protocol communication with the host device; and
initializing, by the accessory, a protocol stack for accessory protocol communication with the host device; and
after initializing the protocol stack:
sending, by the accessory, an identification message to the port of the host device, the identification message conforming to the accessory protocol, the identification message indicating whether the accessory supports encryption of accessory protocol messages at a link layer of a protocol stack used by the accessory for accessory protocol communication;
receiving, from the host device, a begin-encryption message conforming to the accessory protocol; and
encrypting, by the accessory, one or more outgoing accessory protocol messages sent to the port of the host device after receiving the begin-encryption message, the encryption being performed at the link layer of the protocol stack.

11. The method of claim 10 wherein determining whether the invitation message should be accepted includes determining, by the accessory, whether the accessory is already in communication with another host device using the accessory protocol, wherein the invitation is not accepted if the accessory is already in communication with another host device.

12. The method of claim 10 wherein determining whether the invitation message should be accepted includes determining, by the accessory, whether the accessory is already in communication with another host device using the accessory protocol, the method further comprising, if the accessory is already in communication with another host device:
discontinuing communication with the other host device; and
determining that the invitation message should be accepted.

13. The method of claim 10 further comprising:
in response to determining that the invitation message should not be accepted, sending, by the accessory, a decline message to the host device.

14. A host device comprising:
a wireless communication interface;
a user interface; and
a processor coupled to the wireless communication interface and the user interface, the processor being configured to:

join the host device to a wireless network via the wireless communication interface;

detect a service information record from an accessory via the wireless network, the service information record including an accessory identifier of the accessory and an indication that the accessory supports an accessory protocol;

determine, based at least in part on the broadcast record, that an accessory-protocol communication channel should be established with the accessory;

send an invitation message to the accessory via the wireless network, the invitation including an address of the host device and a dynamically assigned port identifier for a virtual port of the host device to be used for accessory protocol communication with the accessory;

receive, at the virtual port, a detection message from the accessory, the detection message being a message defined by the accessory protocol as indicating that the accessory is initiating accessory-protocol communication with the host device;

initialize, in response to the detection message, a protocol stack for accessory protocol communication with the accessory, the protocol stack being connected to the virtual port, the protocol stack including a link layer; and after initializing the protocol stack:
receive, at the virtual port, an identification message conforming to the accessory protocol from the accessory, the identification message indicating whether the accessory supports encryption of accessory protocol messages at the link layer of the protocol stack;

determine, by the host device, whether to operate in an encrypted mode, the determination being based on the identification message; and in response to determining that the host device is to operate in the encrypted mode:
send, by the host device, a start-encryption message to the accessory, the start-encryption message conforming to the accessory protocol; and encrypt, by the host device, one or more outgoing accessory protocol messages sent to the accessory after sending the start-encryption message, the encryption being performed at the link layer of the protocol stack.

15. The host device of claim 14 wherein the processor is further configured to create the virtual port and generate the port identifier in response to determining that the accessory-protocol communication channel should be established.

16. The host device of claim 14 wherein the processor is further configured such that determining that the accessory-protocol communication channel should be established with the accessory includes receiving, via the user interface, a user input indicating that the host device should connect to the accessory.

17. An accessory comprising:
a wireless communication interface; and
a controller coupled to the wireless communication interface, the controller being configured to:
join the accessory to a wireless network via the wireless communication interface;

broadcast a service information record on the wireless network, the service information record including an accessory identifier and an indication that the accessory supports an accessory protocol;

receive an invitation message from a host device on the wireless network, the invitation message including an address of the host device and a port identifier for a virtual port on the host device to be used by the accessory for accessory-protocol communication with the host device;

send a detection message to the virtual port of the host device, the detection message being a message defined by the accessory protocol as indicating that the accessory is initiating accessory-protocol communication with the host device; and initialize a protocol stack for accessory protocol communication with the host device; and after initializing the protocol stack:
sending, by the accessory, an identification message to the port of the host device, the identification message conforming to the accessory protocol, the identification message indicating whether the accessory supports encryption of accessory protocol messages at a link layer of a protocol stack used by the accessory for accessory protocol communication;

receiving, from the host device, a begin-encryption message conforming to the accessory protocol; and encrypting, by the accessory, one or more outgoing accessory protocol messages sent to the port of the host device after receiving the begin-encryption message, the encryption being performed at the link layer of the protocol stack.

18. The accessory of claim 17 wherein the controller is further configured to determine whether to accept the invitation message from the host device, the determination based at least in part on whether the accessory is already in communication with another host device using the accessory protocol.

* * * * *